United States Patent
Kraft et al.

(10) Patent No.: US 10,711,694 B2
(45) Date of Patent: Jul. 14, 2020

(54) SYSTEM AND METHOD FOR DE-ICING A GAS TURBINE ENGINE

(71) Applicant: POWERPHASE LLC, Jupiter, FL (US)

(72) Inventors: Robert J. Kraft, Tequesta, FL (US); Steven Quisenberry, Stuart, FL (US); Scott Auerbach, Jupiter, FL (US)

(73) Assignee: PowerPHASE LLC, Jupiter, FL (US)

( * ) Notice: Subject to any disclaimer, the term of this patent is extended or adjusted under 35 U.S.C. 154(b) by 677 days.

(21) Appl. No.: 15/241,390

(22) Filed: Aug. 19, 2016

(65) Prior Publication Data

US 2017/0051668 A1   Feb. 23, 2017

Related U.S. Application Data

(60) Provisional application No. 62/207,209, filed on Aug. 19, 2015.

(51) Int. Cl.
F02C 7/047   (2006.01)

(52) U.S. Cl.
CPC .............. F02C 7/047 (2013.01); *Y02E 20/16* (2013.01)

(58) Field of Classification Search
CPC .. F02C 7/047; F02C 7/05; F02C 7/052; F02C 7/055
See application file for complete search history.

(56) References Cited

U.S. PATENT DOCUMENTS

| | | | |
|---|---|---|---|
| 9,388,737 B2 | 7/2016 | Kraft | |
| 2002/0066275 A1 | 6/2002 | Jungsch et al. | |
| 2013/0099944 A1* | 4/2013 | Hanson | F01D 21/10 340/962 |
| 2013/0315711 A1* | 11/2013 | Bryant | F02C 7/00 415/116 |
| 2013/0327012 A1* | 12/2013 | Mahabub | F02C 7/047 60/39.093 |
| 2013/0340439 A1* | 12/2013 | Ekanayake | F02C 7/047 60/779 |
| 2014/0060774 A1 | 3/2014 | Motakef et al. | |
| 2014/0250902 A1 | 9/2014 | Kraft | |
| 2014/0321967 A1* | 10/2014 | Zhang | F02C 7/143 415/1 |

FOREIGN PATENT DOCUMENTS

WO   WO 2014/055717   4/2014

OTHER PUBLICATIONS

International Search Report and Written Opinion dated Jan. 12, 2017, for International Application No. PCT/US2016/047701.

\* cited by examiner

*Primary Examiner* — Craig Kim
(74) *Attorney, Agent, or Firm* — Hissan Anis; Anna Quinn; Allen Poplin

(57) ABSTRACT

The invention relates generally to gas turbine engines used for electrical power generation. More specifically, embodiments of the present invention provide ways for improving gas turbine engine performance by reducing ice build-up on the inlet filter housing through heated air injection.

16 Claims, 5 Drawing Sheets

FIG. 1 – Prior Art

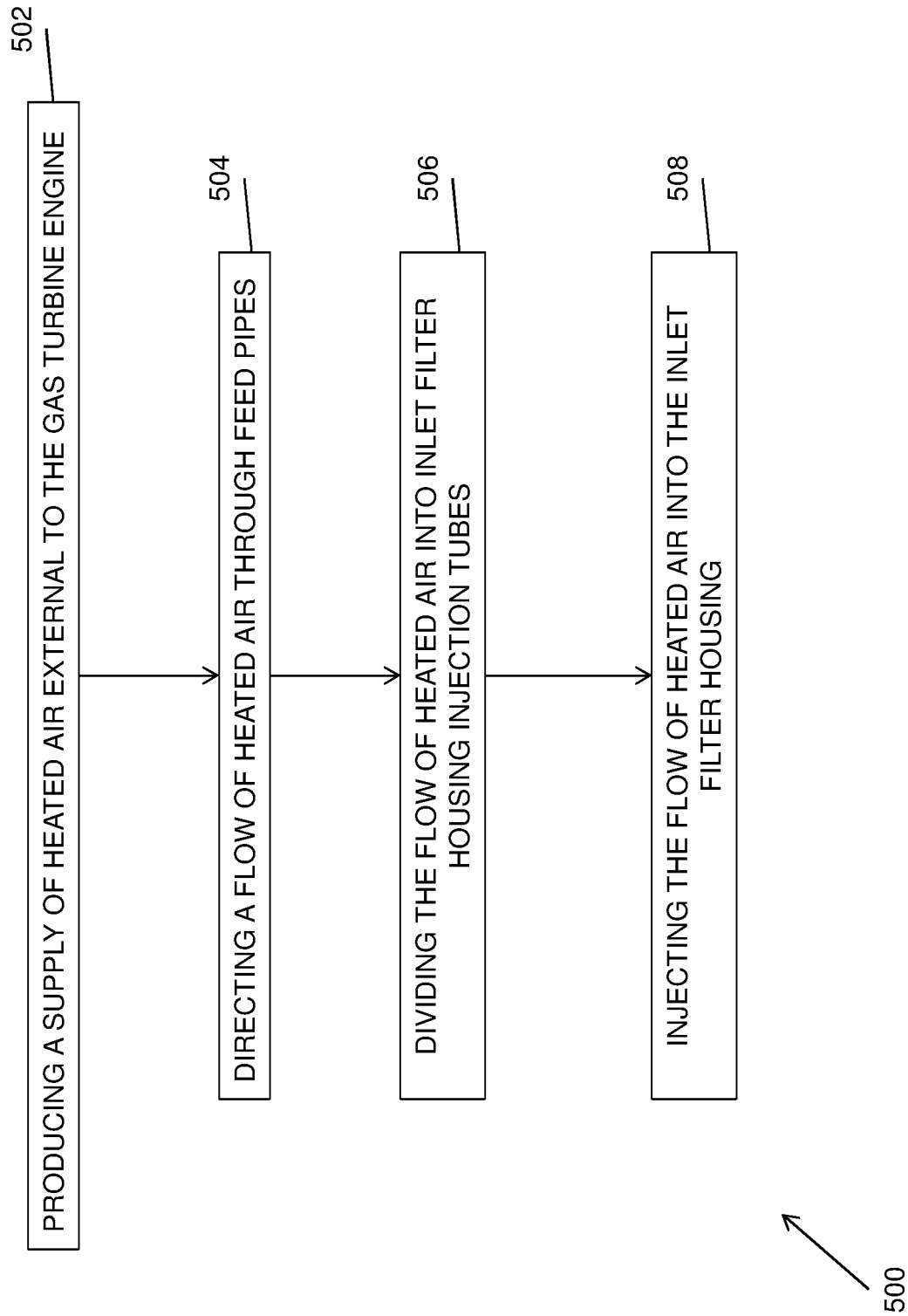

SYSTEM AND METHOD FOR DE-ICING A GAS TURBINE ENGINE

CROSS-REFERENCE TO RELATED APPLICATIONS

This application claims priority to U.S. Provisional Patent Application Ser. No. 62/207,209 filed on Aug. 19, 2015, which is herein incorporated by reference in its entirety.

TECHNICAL FIELD

The invention relates generally to electrical power systems, including generating capacity of a gas turbine, and more specifically to a system and method for reducing ice presence at an inlet filter housing of a gas turbine engine.

BACKGROUND OF THE INVENTION

Gas turbine engines are commonly used in land-based power plants for generating electricity. These land-based power plants take atmospheric air, increase its pressure through a compression process, mix fuel with the compressed air and ignite the mixture to generate hot combustion gases which drive a turbine coupled to the compression system. The mechanical work from the gas turbine engine is used to drive a generator for producing electricity. The exhaust from the gas turbine engine can also be used for producing steam in a combined cycle operation. A representative gas turbine engine is shown in FIG. 1.

The atmospheric air for use in the gas turbine engine 100 is first drawn into an inlet filter housing 102, which is typically elevated above ground level, as shown in FIG. 1. The inlet filter housing 102 is elevated to help reduce dirt and debris from being drawn into the gas turbine engine 100. Furthermore, the inlet filter housing 102 provides a clean and steady air flow to the gas turbine engine 100. These housings contain filters (not shown) which clean the incoming air flow of any dirt, debris or other objects which could damage the gas turbine engine 100.

Unfortunately, many inlet filter housings 102 experience icing on the filters when operating near or below freezing temperatures. Presently, there is no solution to this problem. Icing can also occur due to the freezing of water vapor from nearby power plant cooling towers (not shown). To reduce this tendency, power plant designers have often positioned cooling towers downwind of the inlet filter housing 102, based on the prevailing wind direction, so as to reduce the likelihood of water vapors entering the inlet filter housing and freezing. However, icing on the inlet filter housing during engine operation continues to occur, resulting in ice build-up which creates an excessive pressure drop across the filters due to the blockage in the inlet area. Gas turbine engine control equipment is used to monitor the inlet filter pressure drop as catastrophic structural failure can occur if the pressure drop is too large.

As will be discussed in more detail below, many gas turbine engines use an inlet bleed heat system 110 to help improve engine performance by taking a small portion of heated compressed air from the compressor discharge plenum 112 and directing the heated air through pipes 114 and injecting the heated air into an inlet air system 116 upstream of the engine compressor 118. Injecting heated air through injection tubes 124 helps to raise the temperature of the air entering the compressor 118, but there is a corresponding power loss from the gas turbine engine 100, when working fluid is withdrawn from the compressor discharge plenum 112.

SUMMARY

The present invention relates to systems and methods for improving the performance of the gas turbine engine by reducing icing at the gas turbine engine inlet. In an embodiment of the present invention, a gas turbine engine is provided comprising an inlet filter housing, an inlet air system coupled thereto, a compressor in fluid communication with the inlet air system, a compressor discharge plenum in communication with the compressor, an inlet bleed heat system in fluid communication with the inlet air system, the compressor discharge plenum, and an auxiliary source of compressed air. Heated air is capable of being directed to the inlet filter housing to raise its operating temperature and thereby reduce ice formation on the air filters and housing.

In an alternate embodiment of the present invention, a power augmentation and deicing system is provided comprising an inlet filter housing, an inlet air system coupled thereto, a compressor in fluid communication with the inlet air system, a compressor discharge plenum in communication with the compressor, an auxiliary source of compressed air external to a gas turbine engine system, and a plurality of feed pipes and control valves selectively connecting the compressor discharge plenum, the auxiliary source of compressed air, the inlet air system and the inlet filter housing.

In another embodiment of the present invention, a gas turbine deicing system is provided comprising a first series of air pipes in communication with a compressor discharge plenum where the first series of pipes have an isolation valve. A second series of pipes, which include a deicing valve, are in communication with the first series of air pipes such upon opening of the isolation valve and the deicing valve, air from the compressor discharge plenum is directed to the inlet filter housing for heating the inlet filter housing.

In yet another embodiment of the present invention, a method of reducing ice build-up on an inlet filter housing of a gas turbine engine is provided. The method comprises producing a supply of heated air through an auxiliary source external to the gas turbine engine and flowing the supply of heated air through a plurality of feed pipes and towards the inlet filter housing. The flow of heated air is then divided into injection tubes proximate the inlet filter housing and the heated air is injected into the inlet filter housing.

Other advantages, features and characteristics of the present invention, as well as the methods of operation and the functions of the related elements of the structure and the combination of parts will become more apparent upon consideration of the following detailed description and appended claims with reference to the accompanying drawings, all of which form a part of this specification.

BRIEF DESCRIPTION OF THE SEVERAL VIEWS OF THE DRAWINGS

The present invention is described in detail below with reference to the attached drawing figures, wherein:

FIG. 5 is a flow chart depicting yet another alternate embodiment of the present invention.

DETAILED DESCRIPTION

Figure 1:
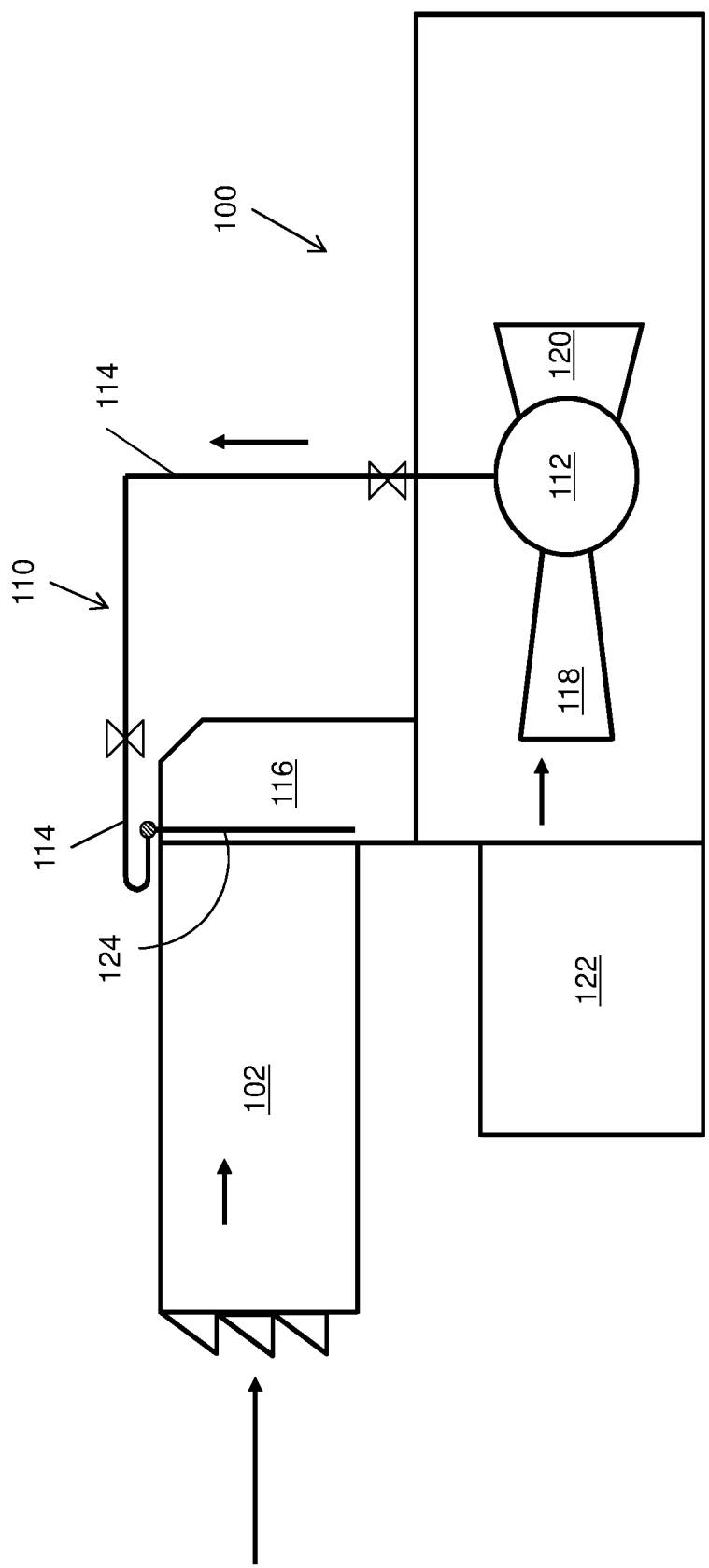
FIG. 1 is a schematic drawing of a gas turbine engine in accordance with the prior art.
Figure 2:
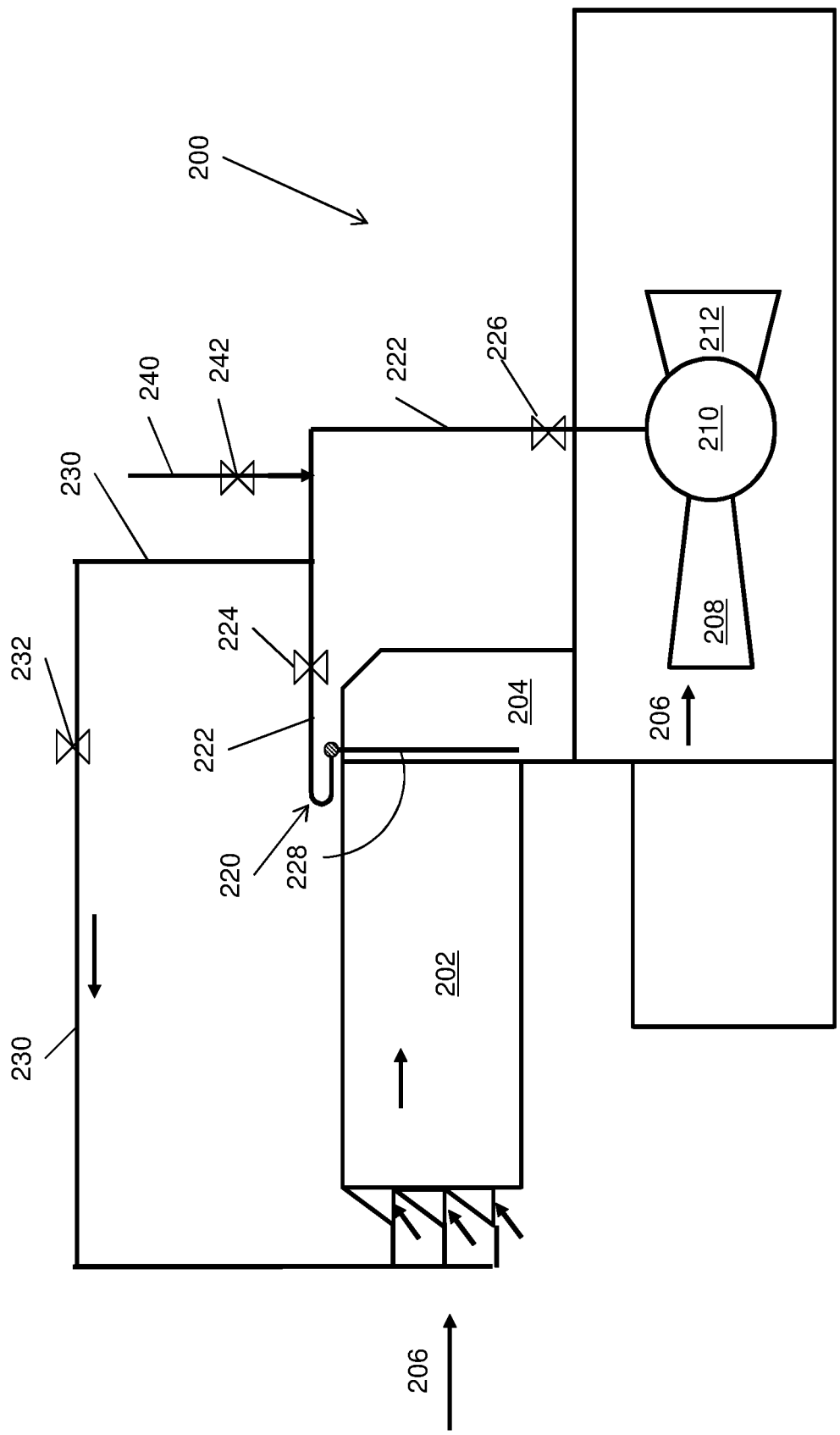
FIG. 2 is a power augmentation and deicing system for a gas turbine engine in accordance with an embodiment of the present invention.

Embodiments of the present invention are described below with respect to FIGS. 2-5. Referring initially to FIG. 2, a gas turbine engine 200 is provided comprising an inlet filter housing 202, an inlet air system 204 in fluid communication with the inlet filter housing 202. The inlet air system 204 directs an incoming airflow 206 from the inlet filter housing 202 to the compressor 208. The gas turbine engine 200 also comprises a compressor discharge plenum 210 which is in fluid communication with the compressor 208. The compressor discharge plenum 210 provides a large volume in which the compressed air from the compressor 208 is directed prior to entering one or more combustors (not shown). Compressed air from the compressor discharge plenum 210 can be withdrawn and used for cooling a turbine 212 or for a variety of other applications.

One such application to which air from the compressor discharge plenum 210 can be used is for an inlet bleed heat system 220, which preheats air prior to entering the compressor 208. The inlet bleed heat system 220 is in fluid communication with the inlet air system 204 and the compressor discharge plenum 210 through a first series of air pipes 222 and an inlet bleed heat control valve 224. In this operation, when it is desirable for compressor discharge air to be used for inlet bleed heating to raise the temperature of air to the compressor 208, the inlet bleed heat valve 224 and isolation valve 226 are opened, permitting a portion of the air from the compressor discharge plenum 210 to be directed through the first series of pipes 222 and to a series of air injection pipes 228, where the air is injected into the inlet air system 204. In this configuration, a portion of the approximately 600-800 degree Fahrenheit compressor discharge air is directed to upstream of the compressor 208.

Another application to which air from the compressor discharge plenum 210 can be utilized is to flow to the inlet filter housing 202 to aid in deicing the inlet filter housing 202 by raising the operating temperature of the inlet filter housing 202. In this embodiment of the present invention, compressed air from the compressor discharge plenum 210 flows through an open isolation valve 226, through a portion of the first series of air pipes 222 and into a second series of air pipes 230, and through an open deicing valve 232 to the inlet filter housing 202. In this embodiment, a portion of the approximately 600-800 degree Fahrenheit compressor discharge air is directed to the inlet filter housing 202 in order to raise its operating temperature and prevent ice formation. However, as discussed above with respect to inlet bleed heat systems, air taken from the compressor discharge plenum 210 for the inlet filter housing 202 draws working fluid out of the gas turbine engine 200, thus reducing its overall power output.

The present invention also provides an improved way of providing the necessary preheating without performance reduction through an auxiliary source of compressed air 240. Heated air is generated external to the engine and directed to the inlet filter housing 202 to raise its operating temperature and reduce ice formation in the inlet filter housing 202.

In one embodiment of the present invention, an auxiliary source of compressed air 240 can be provided to the gas turbine engine 200. The auxiliary source of compressed air 240 provides heated air at a temperature of approximately 500-700 degrees Fahrenheit to the engine 200 without adversely affecting engine performance since it is not taken from elsewhere in the engine. Flow of the auxiliary source of compressed air 240 to the gas turbine engine is regulated by an auxiliary control valve 242.

The auxiliary source of compressed air 240 can be supplied to the inlet filter housing 202 as a source of heated air to raise its operating temperature and prevent ice formation at the inlet filter housing 202. In this embodiment, the isolation valve 226 may be open or closed, and while the inlet bleed heat valve 224 remains closed while the auxiliary control valve 242 and deicing valve 232 are open, such that heated air from the auxiliary source of compressed air 240 flows through at least the second series of pipes 230 and into the inlet filter housing 202.

Figure 3:
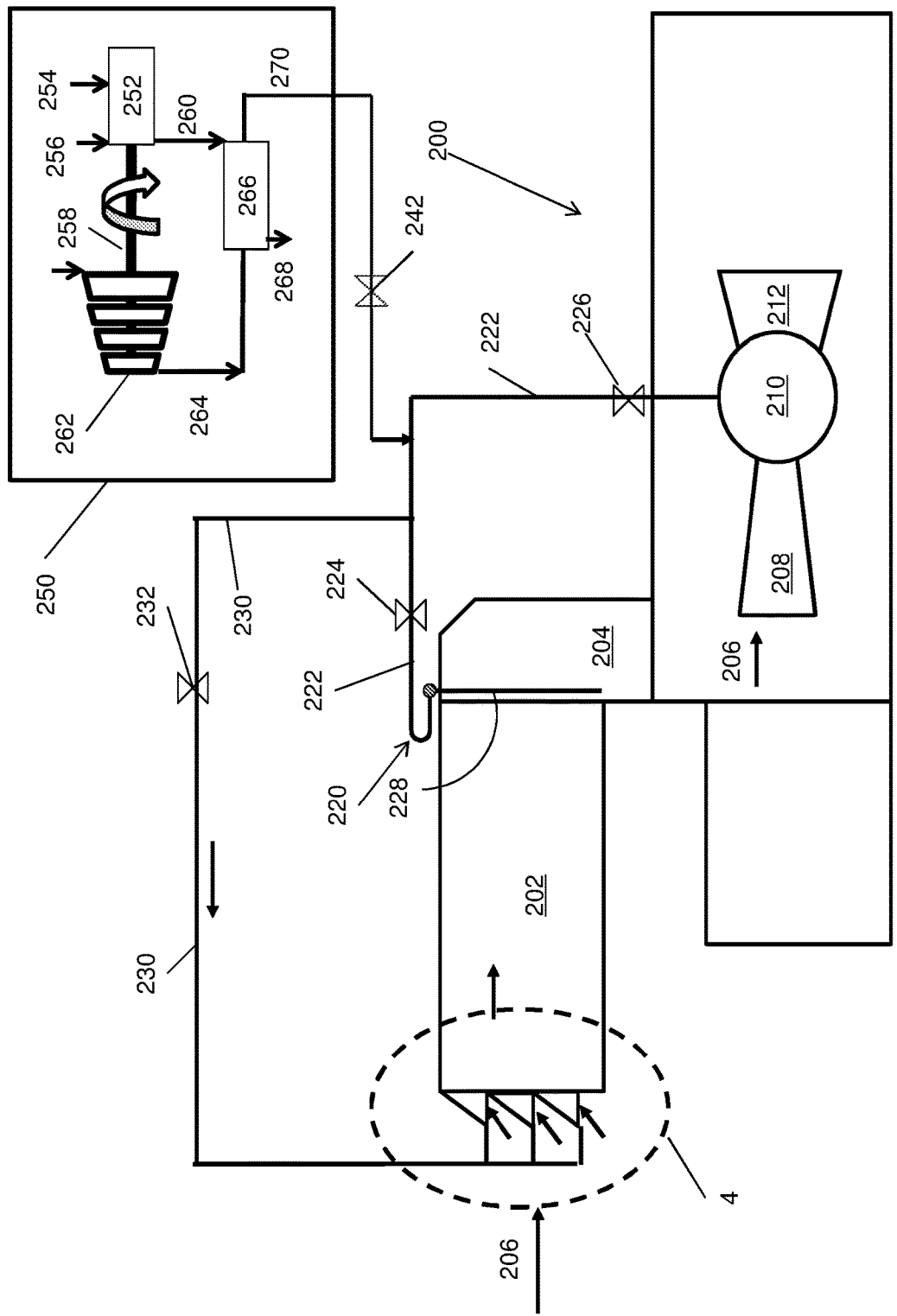
FIG. 3 is a power augmentation and deicing system for a gas turbine engine in accordance with an alternate embodiment of the present invention.

The auxiliary source of compressed air 240 can take on a variety of embodiments, such as an auxiliary supply tank or separate generating body. One such separate generating body is a separate compressed air source 250, as depicted in FIG. 3. An acceptable option for the separate compressed air source 250, is one or more TurboPHASE™ units, a commercial air injection unit provided by PowerPHASE of Jupiter, Fla., an embodiment of which is disclosed in U.S. Pat. No. 9,388,737.

In this embodiment of the present invention, a fueled engine 252 receives air 254 and fuel 256 to operate the fueled engine 252 and generate mechanical output in the form of power to shaft 258 and heated exhaust 260. As used herein, the term "fueled engine" means a heat engine, such as a piston driven or rotary (e.g. Wankel) internal combustion engine (e.g. gasoline engine, diesel engine, natural gas fired engine, or similar fuels, or a combination of such fuels) or a gas turbine, that produces work by combusting a fuel with air to heat a working fluid which then drives blades or the like. The shaft 258 turns a mutli-stage auxiliary compressor 262 which compresses the air, and as a result, also raises the air temperature. Depending on the configuration of the separate compressed air source, the compressor 262 may be an intercooled compressor, where the air is cooled between each stage of the compressor, thereby allowing for further compression of the air over more typical compression systems. According to one embodiment, the auxiliary compressor 262 is a multistage compressor having at least one upstream compression stage and at least one downstream compression stage fluidly downstream of the upstream compression stage, and the step of operating the fueled engine to drive the auxiliary compressor to produce compressed air from the auxiliary compressor includes the step of cooling the compressed air exiting the upstream compression stage before delivering it to the downstream compression stage. Preferably, the apparatus further comprises an intercooler heat exchanger fluidly connected to at least one of the stage inlets and at least one of the stage outlets to cool the compressed air exiting the at least one of the stage outlets prior to delivering the compressed air to the at least one of the stage inlets downstream thereof.

Air 264 from the compressor 262 is then directed to a recuperator 266 where it is heated with exhaust heat 260 from the fueled engine 252. Waste heat 268 from the recuperator 266 is discharged to the atmosphere while the heated compressed air 270 is ready to be used in the gas turbine engine 200. As discussed above, the heated compressed air 270 forms the auxiliary source of compressed air 240 which is directed through the second series of air pipes 230 and to the inlet filter housing 202 for deicing of the inlet filter housing 202.

In yet another embodiment of the present invention, the heated compressed air 270 from the separate compressed air source 250 can be used as a source of inlet bleed heat by directing the heated compressed air 270 through an open auxiliary control valve 242, through the first series of pipes 222 and through an open inlet bleed heat control valve 224 and to the series of air injection pipes 228.

Figure 4:
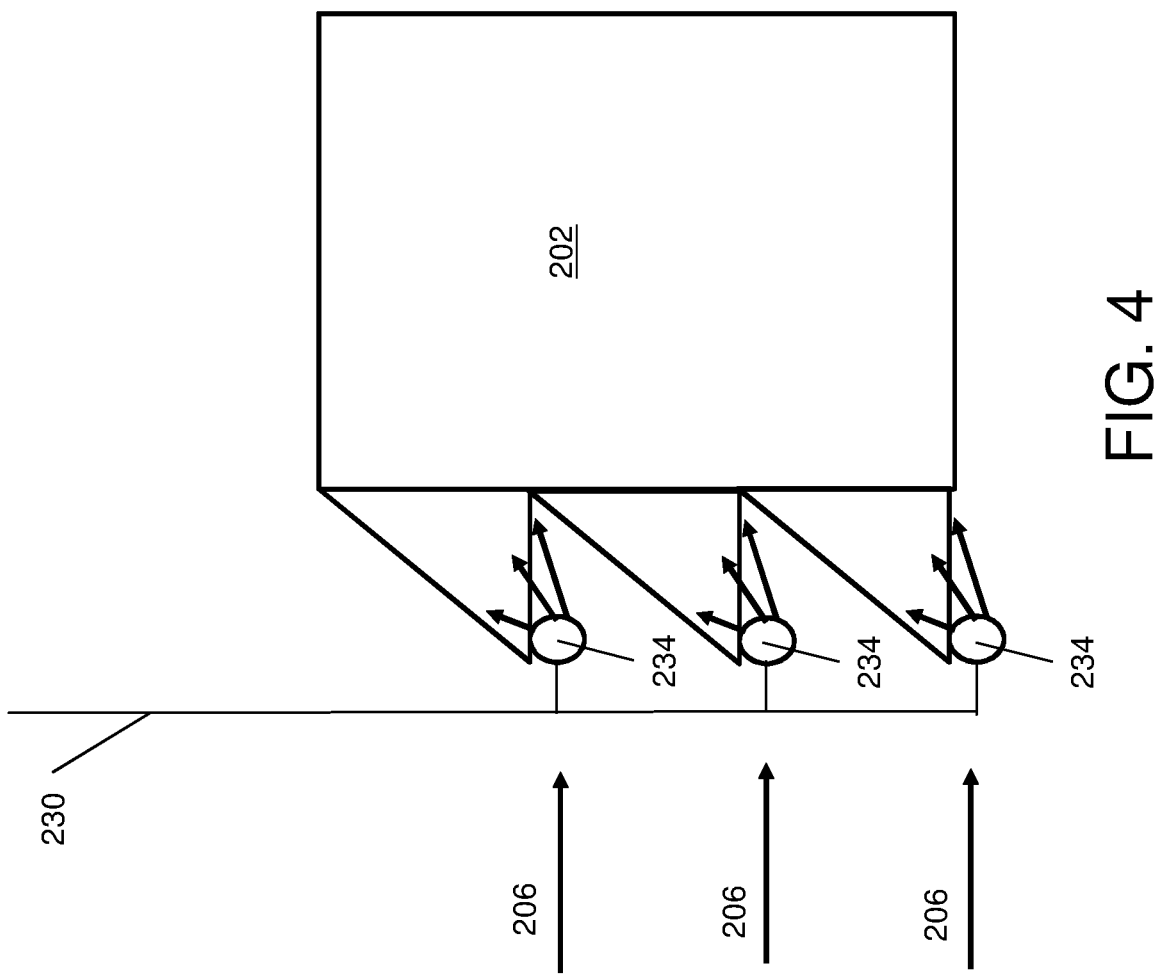
FIG. 4 is a detailed view of a portion of the power augmentation and deicing system for a gas turbine engine in accordance with the embodiment of the present invention of FIG. 3.

Referring now to FIG. 4, further details of the way the heated air is injected into the inlet filter housing 202 is depicted. Atmospheric air 206 is drawn into the inlet filter housing 202 through a plurality of openings. When a predetermined pressure drop occurs in the inlet filter housing 202, indicating icing of the inlet filters, the deicing system of the present invention is activated. Heated compressed air is passed through the second series of pipes 230 and to a plurality of injector pipes 234 proximate the openings to the filter housing 202. The exact quantity of injector pipes 234 can vary depending on the inlet configuration of the gas turbine engine. For the embodiment shown in FIG. 4, multiple rows of injector holes are positioned within each injector pipe 234 for injecting the heated compressed air into the inlet filter housing 202. However, as with the quantity of pipes 234, the quantity of holes, spacing, and orientation can vary depending on the engine configuration and inlet filter housing heating requirements. It is preferred that the heated air being injected in a way to raise the temperature of the inlet housing uniformly. Alternatively, heated air can be targeted to specific areas of the inlet know for ice build-up through injection hole location, size, and injection angle.

Referring now to FIG. 5, a method of reducing ice build-up on an inlet filter housing of a gas turbine engine is depicted. In this alternate embodiment of the present invention, the method 500 comprises, in a step 502, producing a supply of heated air through an auxiliary source that is external to the gas turbine engine. Then, in a step 504, the supply of heated air generated in step 502 is flowed through one or more feed pipes and towards the inlet filter housing. In a step 506, the heated air is divided into injection tubes proximate the inlet filter housing. As discussed above, the exact quantity of injection tubes can vary as required in order to provide the required amount of heated air to the inlet filter housing to reduce the tendency for ice build-up. Then, in a step 508, the supply of heated air is injected into the inlet filter housing. A series of control valves are operated by a control system to regulate the source of heated air as well as volume of heated air being injected into the inlet filter housing.

As those skilled in the art will readily appreciate, each of the embodiments of the present invention includes flow control valves, backflow prevention valves, and shut-off valves as required to insure that the flow of air, auxiliary compressed air, and compressor discharge air flow only in the directions described herein. While the particular systems, components, methods, and devices described herein and described in detail are fully capable of attaining the above-described objects and advantages of the invention, it is to be understood that these are but embodiments of the invention and are thus representative of the subject matter which is broadly contemplated by the present invention. The scope of the present invention fully encompasses other embodiments which may become obvious to those skilled in the art, and that the scope of the present invention is accordingly to be limited by nothing other than the appended claims. It will be appreciated that modifications and variations of the invention are covered by the above teachings and within the purview of the appended claims without departing from the spirit and intended scope of the invention.

The invention claimed is:

1. A system for providing power augmentation and deicing to a gas turbine engine comprising:
    an auxiliary multi-stage compressor external to the gas turbine engine;
    a fueled engine coupled to the multi-stage compressor;
    a recuperator in fluid communication with the multi-stage compressor and the fueled engine;
    an auxiliary control valve for regulating a flow of compressed air from the recuperator and to a series of air pipes, the series of air pipes in fluid communication with a compressor discharge region of the gas turbine engine and an inlet filter housing of the gas turbine engine;
    wherein the fueled engine drives the multi-stage compressor to produce a source of compressed air which is heated in the recuperator by exhaust from the fueled engine such that heated compressed air is provided to at least one of a compressor discharge region of the gas turbine engine for power augmentation and to an inlet filter housing for deicing of an inlet region of the gas turbine engine.

2. The system of claim 1 further comprising a deicing valve for regulating a flow of heated compressed air to the inlet filter housing.

3. The system of claim 1, wherein the heated compressed air is injected into the inlet filter housing through one or more injector pipes.

4. The system of claim 1, wherein the heated compressed air is directed to an inlet bleed heat system for preheating air prior to entering a compressor of the gas turbine engine.

5. The system of claim 4, wherein the heated compressed air is directed through the open auxiliary control valve, through a first series of air pipes, and through an open inlet bleed heat control valve.

6. The system of claim 4 further comprising an inlet bleed heat control valve in fluid communication with the series of air pipes wherein when the inlet bleed heat control valve is open, the source of compressed air is directed to an inlet bleed heat system for heating air prior to entering a compressor of the gas turbine engine.

7. A system for providing power augmentation and deicing to a gas turbine engine comprising:
    an auxiliary multi-stage compressor external to the gas turbine engine;
    a fueled engine coupled to the multi-stage compressor;
    a recuperator in fluid communication with the multi-stage compressor;
    an auxiliary control valve for regulating a flow of compressed air from the recuperator and to a series of air pipes; and
    wherein the fueled engine drives the multi-stage compressor to produce a source of compressed air which is heated in the recuperator such that heated compressed air is selectively provided to a compressor discharge region of the gas turbine engine for power augmentation and to an inlet filter housing for deicing of an inlet region of the gas turbine engine.

8. The system of claim 7 further comprising an isolation valve for isolating the compressor discharge region.

9. The system of claim 7 further comprising a deicing valve for regulating a flow of heated compressed air to the inlet filter housing.

10. The system of claim 7, wherein the heated compressed air is injected into the inlet filter housing through one or more injector pipes.

11. The system of claim 7, wherein the heated compressed air is directed to an inlet bleed heat system for preheating air prior to entering a compressor of the gas turbine engine.

12. The system of claim 7, wherein the heated compressed air is directed through the open auxiliary control valve, through a first series of air pipes, and through an open inlet bleed heat control valve.

13. The system of claim 7 further comprising an inlet bleed heat control valve in fluid communication with the series of air pipes wherein when the inlet bleed heat control valve is open, the source of compressed air is directed to an inlet bleed heat system for heating air prior to entering a compressor of the gas turbine engine.

14. A system for providing power augmentation and deicing to a gas turbine engine comprising:
an auxiliary compressor external to the gas turbine engine;
a fueled engine coupled to the auxiliary compressor;
a recuperator in fluid communication with the auxiliary compressor;
an auxiliary control valve for regulating a flow of compressed air from the recuperator and to a series of pipes; and
wherein the fueled engine drives the auxiliary compressor to produce a source of compressed air which is heated in the recuperator such that heated compressed air is selectively provided to a compressor discharge region of the gas turbine engine for power augmentation and to an inlet filter region of the gas turbine engine for deicing.

15. The system of claim 14, wherein the heated compressed air is provided to the inlet filter region of the gas turbine engine for deicing based on a pressure drop across an inlet filter housing.

16. The system of claim 15, wherein the heated compressed air is provided to the inlet filter region of the gas turbine engine for deicing using a plurality of injector pipes, each of the plurality of injector pipes having a plurality of holes for the egress of the heated compressed air.

* * * * *